(12) United States Patent
Perez Costa et al.

(10) Patent No.: US 8,509,165 B2
(45) Date of Patent: Aug. 13, 2013

(54) METHOD FOR FILLING A WIMAX DOWNLINK FRAME BY THE BASE STATION OF A WIMAX NETWORK

(75) Inventors: Xavier Perez Costa, Heidelberg (DE); Daniel Camps Mur, Heidelberg (DE); Julio Arauz, Leimen (DE)

(73) Assignee: NEC Europe Ltd., Heidelberg (DE)

( * ) Notice: Subject to any disclaimer, the term of this patent is extended or adjusted under 35 U.S.C. 154(b) by 368 days.

(21) Appl. No.: 12/673,658

(22) PCT Filed: Aug. 15, 2007

(86) PCT No.: PCT/EP2007/007203
§ 371 (c)(1),
(2), (4) Date: Jun. 14, 2010

(87) PCT Pub. No.: WO2009/021536
PCT Pub. Date: Feb. 19, 2009

(65) Prior Publication Data
US 2011/0058525 A1    Mar. 10, 2011

(51) Int. Cl.
*H04W 4/00* (2009.01)
*H04L 12/413* (2006.01)
*H04J 3/16* (2006.01)
*H04J 3/22* (2006.01)

(52) U.S. Cl.
USPC ............ 370/329; 370/328; 370/447; 370/468

(58) Field of Classification Search
None
See application file for complete search history.

(56) References Cited

U.S. PATENT DOCUMENTS

| 2007/0070905 A1 | 3/2007 | Oliver et al. |
| 2007/0086474 A1* | 4/2007 | Lee et al. ................. 370/447 |
| 2008/0031190 A1* | 2/2008 | Bae et al. ................. 370/329 |
| 2008/0130605 A1 | 6/2008 | Song et al. |

FOREIGN PATENT DOCUMENTS

| JP | 2007511975 A | 5/2007 |
| WO | 2006/017730 | 2/2006 |

OTHER PUBLICATIONS

Zhifeng Tao et al., "Aggregation and Concatenation in IEEE 802.16j Mobile Multihop Relay (MMR) Networks", Mobile WiMAX Symposium, 2007, IEEE, IEEE, PI, Mar. 1, 2007, XP031079210, ISBN: 978-1-4244-0957-0, pp. 85-90.

(Continued)

*Primary Examiner* — John Blanton
*Assistant Examiner* — Diane Lo
(74) *Attorney, Agent, or Firm* — Young & Thompson

(57) ABSTRACT

A method for filling a WiMAX downlink frame by the base station of a WiMAX network, wherein the downlink MAC Protocol Data Units (MPDUs) are fitted into the WiMAX downlink frame by means of a DL-MAP scheduler, which allows the concatenation of downlink MPDUs from different connections in single bursts, the bursts having a rectangular shape in terms of the two dimensions—OFDMA (Orthogonal Frequency Division Multiple Access) symbols and subchannels—of a WiMAX downlink frame, is characterized in that the DL-MAP scheduler is configured in a way that it considers the concatenation of downlink MPDUs from different connections in single bursts based on the available and/or the remaining free space in the WiMAX downlink frame, such that it simplifies the DL-MAP scheduler task of filling the WiMAX downlink frame minimizing the amount of wasted radio resources.

14 Claims, 2 Drawing Sheets

(56) References Cited

OTHER PUBLICATIONS

Figure 1:
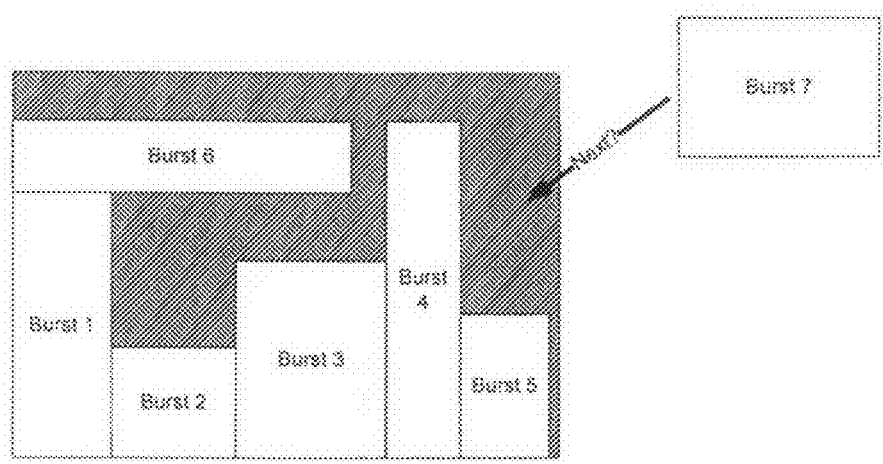

R. Cohen et al., "Computional Analysis and Efficient Algorithms for Micro and Macro OFDMA Scheduling", Technion—Computer Science Department—Technical Report CS-2007-02-2007,pp. 1-12, [Online] Apr. 2007, http://www.cs.technion.ac.il/users/wwwb/cgi-bin/tr-get.cgi/2007/CS/CS-2007-02.pdf.

R. Cohen et al., "Computational Analysis and Efficient Algorithms for Micro and Macro OFDMA Scheduling", 2008, IEEE INFOCOM, [Online] Apr. 13, 2003-Apr. 19, 2008, XP002486613, INSPEC 9962282, pp. 1184-1192, http://ieeexplore.ieee.org/iel5/450594/4509595/04509694.pdf?tp=&arnumber=4509694&isnumber=4509595>.

International Search report dated Jul. 23, 2008, from corresponding PCT application.

Japanese Office Action dated Feb. 23, 2012, from corresponding JP application.

* cited by examiner

METHOD FOR FILLING A WIMAX DOWNLINK FRAME BY THE BASE STATION OF A WIMAX NETWORK

The present invention relates to a method for filling a WiMAX downlink frame by the base station of a WiMAX network, wherein the downlink MAC Protocol Data Units (MPDUs) are fitted into the WiMAX downlink frame by means of a DL-MAP scheduler, which allows the concatenation of downlink MPDUs from different connections in single bursts, the bursts having a rectangular shape in terms of the two dimensions—OFDMA (Orthogonal Frequency Division Multiple Access) symbols and subchannels—of a WiMAX downlink frame.

WiMAX is defined as World Wide Interoperability for Microwave Access based upon the standards family of IEEE 802.16. Just as the Wi-Fi Alliance certifies interoperable implementations of the IEEE 802.11 wireless LAN standard, the WiMAX Forum certifies interoperable implementations of IEEE 802.16 wireless standards.

In WiMAX, the frame filling process in the downlink direction is performed by a so called Downlink MAP (DL-MAP) scheduler. The job of a DL-MAP scheduler is to allocate downlink MPDUs (MAC Protocol Data Units) of a given size in bits into the downlink portion of a WiMAX frame. According to the two current WiMAX standards IEEE 802.16-2004 and 802.16e-2005, a WiMAX frame consists of a specific two dimensional area, wherein the two dimensions of the WiMAX frame are given in form of OFDMA (Orthogonal Frequency Division Multiple Access) symbols and subchannels. The task of the DL-MAP scheduler can be decomposed in two basic subtasks. First, it has to fit the previously mentioned MPDUs into rectangular shapes, defined as bursts in the WiMAX standards, where a specific MCS (Modulation and Coding Scheme) will be applied. Second it has to pack these bursts minimizing the unused space.

The two current WiMAX standards mentioned above do not provide any guidance about how a base station (and a DL-MAP scheduler, respectively) should together within the rectangular WiMAX downlink frame realize the previously mentioned tasks. The performance of the system highly depends on the DL-MAP scheduler algorithm since it determines how efficiently the radio resources are used.

In the 802.16 standards a mechanism is specified which allows the aggregation of different MPDUs which use the same MCS in a single burst. This mechanism is defined as concatenation. By concatenating MPDUs belonging to different connection identifiers (CID) in a single burst the signalling overhead due to the DL-MAP size can be reduced. The WiMAX standards though, do not specify any criteria or algorithm to make a particular use of the concatenation mechanism.

The objective of the present invention is to define a method for a DL-MAP scheduler that by making an alternative use of the concatenation mechanism it simplifies the DL-MAP scheduler task of filling the WiMAX downlink frame with MPDUs and minimizes the amount of wasted radio resources (padding and empty space).

In accordance with the invention, the aforementioned object is accomplished by a method comprising the features of claim 1. According to this claim, such a method is characterized in that the DL-MAP scheduler is configured in a way that it considers the concatenation of downlink MPDUs from different connections in single bursts based on the available and/or the remaining free space in the WiMAX downlink frame, such that it simplifies the DL-MAP scheduler task of filling the WiMAX downlink frame minimizing the amount of wasted radio resources.

According to the invention the DL-MAP scheduler is configured in such a way that it considers the concatenation of downlink MPDUs from different connections in single bursts, based on the available/remaining free space in the downlink WiMAX frame and its form, in order to simplify the DL-MAP scheduler task of filling the WiMAX downlink frame with MPDUs. By taking into account the available/remaining free space in the downlink WiMAX frame in the context of the MPDU concatenation in bursts, the amount of wasted radio resources (in terms of padding and empty space) can be significantly minimized. Therefore, this invention proposes a solution that considers together the two previously mentioned subtasks of the DL-MAP scheduler in order to enhance the efficient use of the scarce radio resources.

In a preferred embodiment, the concatenation of downlink MPDUs in bursts and its placement in the downlink portion of the WiMAX downlink frame is performed in such a way that the available/remaining space after placing the burst results in a polygon or polygons with a geometrical form as regular as possible. A regular geometrical form of the remaining space after placing a burst results in the advantage of easing the placement of the next burst.

As an example of application, the concatenation of downlink MPDUs in bursts could be performed in such a way that the bursts either fill a whole column or a whole row of the available remaining space of the downlink portion of a WiMAX frame. An allocation by whole columns though might be preferred, since besides easing the packing task of the DL-MAP scheduler, it can have other benefits like reduced power consumption or the possibility to allocate more resources for the uplink if needed.

According to an advantageous embodiment, an algorithm is used that considers the sizes of all MPDUs belonging to the same Modulation and Coding Scheme (MCS) and groups them in subsets, such that the aggregate size plus possibly a certain admissible padding of each candidate subset matches the size of the part of the available/remaining space shape under consideration. For instance, the algorithm may consider all possible combinations between MPDUs belonging to the same MCS and select the one requiring less padding for filling the target part of the empty space of the WiMAX frame. Alternatively, the algorithm may apply a heuristic in order to find a suitable concatenation between MPDUs that can properly fill part of the available empty space. Such heuristic may result in a faster concatenation than considering all possible combinations. In both cases it may be provided that the algorithm tries to concatenate first the MPDUs of larger size.

As regards efficient energy consumption and power saving, it may be provided that the decision of concatenation of MPDUs prefers bursts presenting a length in the subchannels dimension larger than in the symbols.

In particular in TDD (Time Division Duplex) systems, it may be provided that the concatenation of MPDUs is performed by starting filling the empty space in the WiMAX downlink frame column-wise (subchannels dimension) from left to right (symbols dimension). Such an approach is preferable as it allows for a more efficient sharing of the overall capacity between the uplink and downlink frames.

Moreover, the decision of concatenation of MPDUs may take into account that some MPDUs need to be transmitted in the next WiMAX frame due to QoS requirements and some do not. That is to say, MPDUs with a high priority with respect to QoS requirements are processed in a preferential way compared to lower priority MPDUs even if the size of the MPUDs may be less favourable as regards an optimal filling of the WiMAX downlink frame. To what extent concatenation decisions regarding an optimal filling of the WiMAX downlink frame are preferred over QoS requirements may be a configurable parameter.

There are several ways to design and further develop the teaching of the present invention in an advantageous way. To this end, it is to be referred to the patent claims subordinate to patent claim 1 and to the following explanation of a preferred example of an embodiment of the invention, illustrated by the figure. In connection with the explanation of the preferred example of an embodiment of the invention by the aid of the figure, generally preferred embodiments and further developments of the teaching will be explained.

Figure 2:
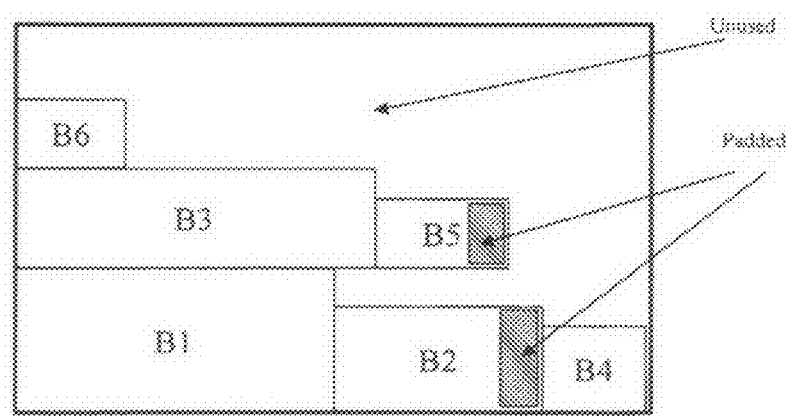
Figure 3:
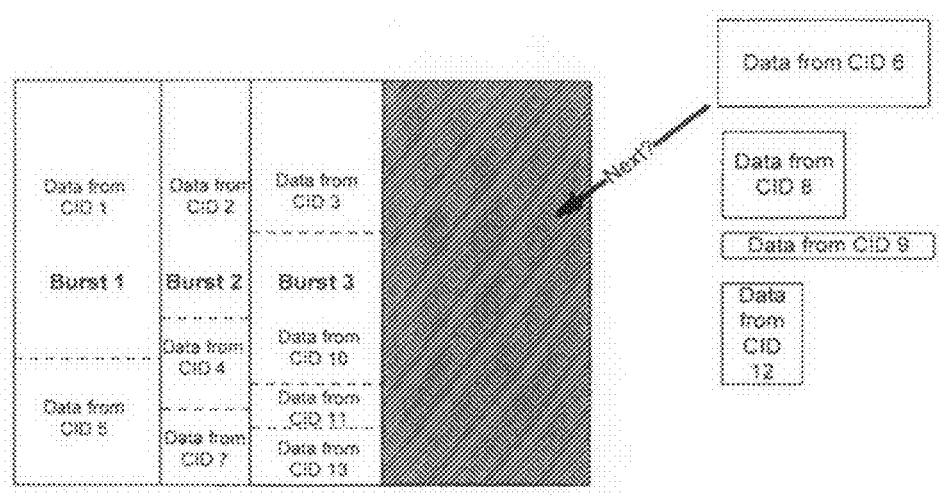

In the drawings:

FIG. 1 shows a first method for processing of downlink data frames at a base station of a WiMAX network according to the state of the art, FIG. 2 shows another method for processing of downlink data frames at a base station of a WiMAX network according to the state of the art, and FIG. 3 shows a preferred embodiment of a method for processing of downlink data frames at a base station of a WiMAX network according to the invention.

In FIG. 1 a typical WiMAX frame is depicted in which the horizontal dimension is divided into single OFDMA symbols (which are not explicitly shown) and in which the vertical dimension is divided into single subchannels (also not explicitly shown). According to the state of the art the bursts which have to be broadcasted in the downlink via the radio link are fitted into the WiMAX frame considering the shape of the rectangular bursts as a fixed given input. The shape of the bursts could have been chosen such that it minimizes padding, for instance The DL-MAP scheduler in this case starts with the burst labelled burst 1 by fitting it in the lower left part of the WiMAX frame. Burst 2 to burst 5 follow. For burst 6 there is not enough space available on the right side of burst 5 and, therefore, burst 6 is fitted on top of burst 1 into the upper left part of the WiMAX frame. The next burst—burst 7—which is almost quadratic in shape can't be fitted into the WiMAX frame anymore as there is now appropriate area in terms of OFDMA symbols and subchannels available. Consequently, the WiMAX frame containing bursts 1 to 6 is considered to be full and is broadcasted. Hence, the available radio resources are utilized in a very inefficient way.

FIG. 2 shows another mechanism according to the state of the art which is slightly improved compared with the method described in connection with FIG. 1. In the scenario shown in FIG. 2 the bursts are fitted into the WiMAX frame according to a better algorithm but the shapes of the different bursts are still considered a fixed given input for the algorithm. The algorithm starts with fitting the burst with the largest size in vertical direction, i.e. the burst that covers the most subchannels, into the lower left edge of the WiMAX frame. Afterwards the burst with the second largest extension in vertical direction—burst B2—is fitted into the WiMAX frame adjacent to the first burst B1. This process is repeated till there are not enough slots left for fitting a next burst. Specifically, in FIG. 2 this process stops after burst B4 is fitted into the lower row. The next burst, i.e. the burst with the next large number of subchannels covered, here labelled as burst B3, does not fit anymore into the lower row as there are not enough slots available. Consequently, a new row is started and filled with bursts as described above. However, as can be obtained from FIG. 2, there is still a large spaced unused which means that available radio resources are wasted.

FIG. 3 shows a preferred embodiment of a method for processing of downlink data frames at a base station of a WiMAX network according to the invention. Downlink data frames from different connection identifiers are allocated in bursts taking into consideration the available/remaining space of the downlink portion of the WiMAX frame. In the embodiment shown in FIG. 3 the allocation is performed by trying to generate bursts which fill complete columns of the WiMAX frame. For example, in burst 1 data from CID 1 and data from CID 5 are allocated, thereby filling all subchannels of the WiMAX frame in several slots. The same holds true for adjacent 2 (allocating data from CID 2, CID 4, CID 7) and for adjacent burst 3 (allocating data from CID 3, CID 10, CID 11 and CID 13).

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for filling a WiMAX downlink frame by the base station of a WiMAX network, wherein the downlink MAC Protocol Data Units (MPDUs) are fitted into the WiMAX downlink frame by means of a DL-MAP scheduler, which:

allows the concatenation of downlink MPDUs from different connections in single bursts, the bursts having a rectangular shape in terms of the two dimensions—OFDMA (Orthogonal Frequency Division Multiple Access) symbols and subchannels—of a WiMAX downlink frame;

considers the concatenation of downlink MPDUs from different connections in single bursts based on the available and/or the remaining free space in the WiMAX downlink frame, such that it simplifies filling the WiMAX downlink frame minimizing the amount of wasted radio resources; and uses an algorithm that considers the sizes of all MPDUs belonging to the same Modulation and Coding Scheme (MCS) and groups them in subsets, such that the aggregate size plus possibly a certain admissible padding of each candidate subset matches the size of the part of the available/remaining space shape under consideration.

2. Method according to claim 1, wherein the concatenation of downlink MPDUs in a burst and its placement in the downlink portion of the WiMAX downlink frame is performed in such a way that the available/remaining space after placing the burst results in a polygon or polygons with a geometrical form as rectangular as possible.

3. Method according to claim 2, wherein the concatenation of downlink MPDUs in a burst is performed in such a way that the burst either fills completely or partially a whole column or a whole row of a WiMAX downlink frame.

4. Method according to claim 2, wherein an algorithm is used that considers the sizes of all MPDUs belonging to the same Modulation and Coding Scheme (MCS) and groups them in subsets, such that the aggregate size plus possibly a certain admissible padding of each candidate subset matches the size of the part of the available/remaining space shape under consideration.

5. Method according to claim 1, wherein the concatenation of downlink MPDUs in a burst is performed in such a way that the burst either fills completely or partially a whole column or a whole row of a WiMAX downlink frame.

6. Method according to claim 5, wherein an algorithm is used that considers the sizes of all MPDUs belonging to the same Modulation and Coding Scheme (MCS) and groups them in subsets, such that the aggregate size plus possibly a certain admissible padding of each candidate subset matches the size of the part of the available/remaining space shape under consideration.

7. Method according to claim 1, wherein the said algorithm considers all possible combinations between MPDUs belonging to the same MCS and selects the one requiring less padding for filling the target part of the empty space.

8. Method according to claim 7, wherein the said algorithm tries to concatenate first the MPDUs of larger size.

9. Method according to claim 1, wherein the said algorithm applies a heuristic in order to find a suitable concatenation between MPDUs that can properly fill part of the available empty space in a faster way than considering all possible combinations.

10. Method according to claim 9, wherein the said algorithm tries to concatenate first the MPDUs of larger size.

11. Method according to claim 1, wherein the said algorithm tries to concatenate first the MPDUs of larger size.

12. Method according to claim 1, wherein the decision of concatenation of MPDUs takes into account that bursts presenting a length in the subchannels dimension larger than in the symbols one are preferable due to power saving efficiency.

13. Method according to claim 1, wherein the decision of concatenation of MPDUs takes into account that in TDD (Time Division Duplex) systems it is preferable to start filling the empty space in the WiMAX downlink frame column-wise (subchannels dimension) from left to right (symbols dimension) in order to allow for a more efficient sharing of the overall capacity between the uplink and downlink frames.

14. Method according to claim 1, wherein the decision of concatenation of MPDUs takes into account that some MPDUs need to be transmitted in the next WiMAX frame due to QoS requirements and some do not.

\* \* \* \* \*

UNITED STATES PATENT AND TRADEMARK OFFICE
CERTIFICATE OF CORRECTION

PATENT NO. : 8,509,165 B2  Page 1 of 1
APPLICATION NO. : 12/673658
DATED : August 13, 2013
INVENTOR(S) : Perez Costa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this
Fifteenth Day of September, 2015

Michelle K. Lee
*Director of the United States Patent and Trademark Office*